July 10, 1928.
P. H. FRANK
SHAFT BEARING
Filed March 2, 1927
1,676,894
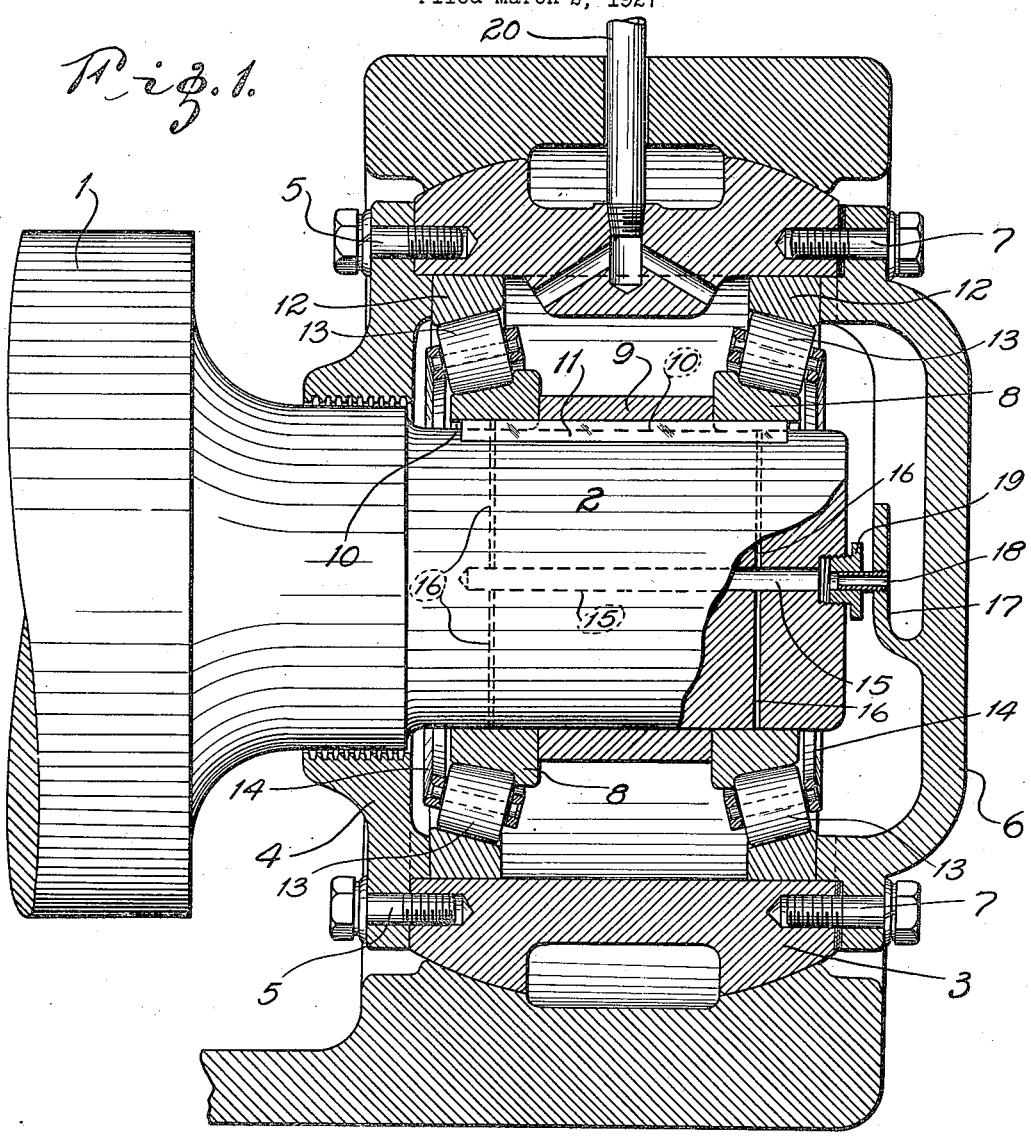
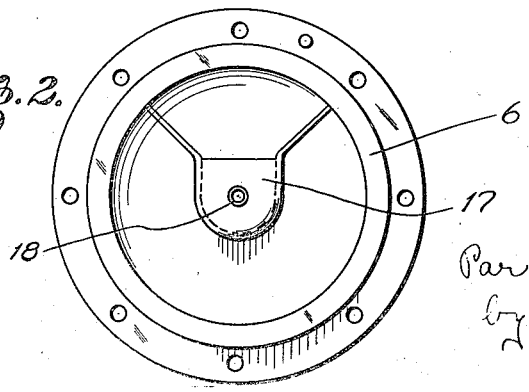
INVENTOR:
Pardee H. Frank,
by Carr & Carr & Gravely
HIS ATTORNEYS Patented July 10, 1928.

1,676,894

UNITED STATES PATENT OFFICE.

PARDEE H. FRANK, OF CANTON, OHIO, ASSIGNOR TO THE TIMKEN ROLLER BEARING COMPANY, OF CANTON, OHIO, A CORPORATION OF OHIO.

SHAFT BEARING.

Application filed March 2, 1927. Serial No. 171,960.

My invention relates to roller bearing constructions, particularly to constructions in which there is a tendency for the cones or inner bearing members to creep on the member on which they are mounted or to gall thereto; and it has for its principal object to prevent this creeping or galling. The invention consists principally in lubricating the bores of the cones or inner bearing members, as by providing a film of oil therein. The invention consists further in the shaft bearing and in the parts and combinations and arrangements of parts hereinafter described and claimed.

In the accompanying drawing, wherein like reference numerals indicate like parts wherever they occur, Fig. 1 is a longitudinal section of a shaft bearing embodying my invention, embodied in a construction wherein the shaft rotates at high speed and is capable of endwise movement in the bearings; and Fig. 2 is an inside view of the end cap that closes the housing in which the bearings are mounted.

A rotary shaft 1 (such as the shaft on which is mounted a rotary saw or cutter) has a reduced end portion 2 that extends into a housing 3. The inner end of the housing is closed by a ring 4 that is secured to the housing, as by screws 5. The outer end of the housing is closed by a cap 6 that is secured to the housing, as by screws 7. Mounted on the end 2 of the shaft 1 are the cones 8 or inner bearing members of roller bearings (conical roller bearings being illustrated) and a spacer sleeve 9, the cones 8 being disposed with their large ends towards each other and being separated by said spacer sleeve. The shaft 1, cones 8 and sleeve 9 are each provided with a longitudinal slot 10 or key-way in which fits a key 11, whereby the cones 8 and sleeve 9 are forced to rotate with the shaft 1, but relative movement may take place between the shaft and said cones and sleeve. The outer bearing members or cups 12 are mounted in said housing 3 and positioned by the ring 4 and cap 6 respectively. Conical rollers 13 are interposed between the cups and cones, said rollers being provided with suitable cages 14.

A shaft that rotates at high speed expands and contracts due to changes in temperature, making it desirable to permit the shaft to move endwise in its bearings. In the present construction, this movement is accommodated by the key connection between the shaft 1 and the bearing cones 8. In ordinary keyed constructions, the bearing cones 8 may freeze on the shaft or gall thereto, resulting in the preventing of relative longitudinal movement or in undue wear on the parts of the mechanism. To prevent this galling or freezing, the shaft 1 is provided with a longitudinal bore 15 and with cross bores 16 connecting with said main bore and opening into the bores of said bearing cones 8, thus forming passageways through which oil may pass to the outer surface of the shaft from the bore and form a film of oil between the shaft and the bearing cones.

A suitable means for supplying oil to the shaft bore is shown in the drawings. The cap 6 is provided with an interiorly projecting flanged portion or wall 17 providing a pocket that is adapted to catch lubricant splashed thereinto from the supply in the housing. The wall 17 of this pocket is provided with an opening in which is mounted a short tube or nipple 18 that fits in a hollow plug or bushing 19 that is mounted in the end of the bore of the shaft, thereby permitting lubricant to pass from the pocket into the bore of the shaft. The loose connection between the nipple and the bushing accommodates the endwise movement of the shaft.

The housing may be provided with a feed pipe 20 through which suitable quantities of lubricant may be introduced thereinto.

The construction above described prevents freezing or galling of the cones and shaft and permits the desired endwise movement of the shaft in the bearings. Lubricant entering the longitudinal passageway of the shaft is caused by centrifugal force to flow to the surface of the shaft through the transverse passageways to the surface of the shaft. The rotation of the shaft creates a suction that draws lubricant from the cap pocket. The invention is applicable to the lubrication of plain bearings or to the lubrication of antifriction bearings as well as to the lubrication of the bores of bearing members. Obviously numerous changes may be made without departing from the invention and I do not wish to be limited to the precise construction shown.

What I claim is:

1. A shaft, a housing, a roller bearing interposed therebetween, said roller bearing including an inner bearing member loosely mounted on said shaft so as to be slidable thereon and rotatable therewith, and means for supplying lubricant to the bore of said inner bearing member, to prevent said inner bearing member from binding on said shaft, said means being independent of the bearing lubricating means.

2. A construction of the kind described comprising a shaft, a housing, and a roller bearing therebetween, said roller bearing including an inner bearing member loosely mounted on said shaft so as to be slidable thereon and rotatable therewith and said shaft being provided with a passageway for supplying lubricant to the bore of said inner bearing member, to prevent said inner bearing member from binding on said shaft, said means being independent of the bearing lubricating means.

3. A shaft, a housing therefor, roller bearings interposed between said shaft and said housing, the inner bearing members being keyed to said shaft so as to be slidable thereon and rotatable therewith and means for supplying lubricant to the bores of said inner bearing members, to prevent binding of said inner bearing member on said shaft, said means being independent of the bearing lubricating means.

4. A construction of the kind described comprising a rotary shaft having a longitudinal bore and cross bores connecting therewith, a fixed housing therefor, a cap for the end of said housing, the inner face of said cap having a pocket adapted to receive lubricant, roller bearings interposed between said shaft and said housing, the inner bearing members being keyed to said shaft so as to be slidable thereon and rotatable therewith and being disposed over the ends of said cross bores and means connecting the longitudinal bore of said shaft with said pocket in said cap.

5. A construction of the kind described comprising a rotary shaft having a longitudinal bore and cross bores connecting therewith, a fixed housing for the end of said shaft, a cap for the end of said housing, the inner face of said cap having a projecting wall portion forming a pocket adapted to receive lubricant, conical roller bearings interposed between said shaft and said housing, the inner bearing members of said bearings being disposed over the ends of said cross bores in said shaft and being slidably keyed to said shaft, a bushing in the end of the longitudinal bore of said shaft and a nipple disposed in an opening provided therefor in the wall of said pocket and extending into said bushing.

6. A shaft, a housing therefor, roller bearings interposed between said shaft and said housing, the inner bearing members being slidably keyed to said shaft, a cap for the end of said housing, a pocket in said cap adapted and arranged to receive lubricant, a passageway for said lubricant leading to the bores of said inner bearing members and means connecting said passageway with said pocket in said cap, said means permitting relative rotation of said shaft and said housing.

Signed at Canton, Ohio, this 23rd day of Feb., 1927.

PARDEE H. FRANK.